US005877499A

United States Patent [19]
Baldwin

[11] Patent Number: 5,877,499
[45] Date of Patent: Mar. 2, 1999

[54] COMPOSITE FRESNEL LENS HAVING ARRAY OF LENS SEGMENTS PROVIDING LONG NARROW DETECTION RANGE

[75] Inventor: John R. Baldwin, Newtown, Conn.

[73] Assignee: Hubbell Incorporation, Orange, Conn.

[21] Appl. No.: 758,888

[22] Filed: Dec. 2, 1996

[51] Int. Cl.⁶ ............................ G02B 3/08; G02B 13/193
[52] U.S. Cl. .................. 250/353; 250/342; 250/DIG. 1; 359/742
[58] Field of Search ................................ 250/353, 342, 250/DIG. 1; 359/742, 743

[56] References Cited

U.S. PATENT DOCUMENTS

| | | |
|---|---|---|
| 4,275,303 | 6/1981 | Mudge . |
| 4,321,594 | 3/1982 | Galvin et al. . |
| 4,429,225 | 1/1984 | Wagli et al. . |
| 4,442,359 | 4/1984 | Lederer . |
| 4,535,240 | 8/1985 | Vigurs . |
| 4,672,206 | 6/1987 | Suzuki et al. ................ 250/DIG. 1 |
| 4,717,821 | 1/1988 | Mession . |
| 4,757,204 | 7/1988 | Baldwin et al. . |
| 4,841,284 | 6/1989 | Biersdorff . |
| 5,393,978 | 2/1995 | Schwarz ........................ 250/342 |
| 5,442,178 | 8/1995 | Baldwin . |

FOREIGN PATENT DOCUMENTS 276502 12/1987 Japan .
2122339 2/1984 United Kingdom .

Primary Examiner—Constantine Hannaher
Assistant Examiner—Darren M. Jiron
Attorney, Agent, or Firm—Jerry M. Presson; David L. Tarnoff; Thomas P. Hilliard

[57] ABSTRACT

A composite Fresnel lens useful in an infrared passive detection system includes an array of Fresnel lens segments having a given vertical centerline and a curvature of a given radius. The Fresnel lens segments fall in first and second groups. Each Fresnel lens segment in the first group has a long detection range and a width less than one-third of the diameter of an original whole Fresnel lens from which the segment was taken. Also, each lens segment of the first group has a geometrical center located horizontally from the vertical centerline of the array along the curvature of the array through a circumferential distance less than one-fourth of the radius of curvature of the array. Each Fresnel lens segment in the second group has a short detection range less than the long detection range by a predetermined amount and a width less than one-third of the diameter of an original whole Fresnel lens from which the segment was taken. Also, each lens segments in the second group has a geometrical center located horizontally from the vertical centerline of the array along the curvature of the array through a circumferential distance less than one-half of the radius of curvature of the array. The Fresnel lens segments have respective optical centers which are aligned along the vertical centerline of the array.

24 Claims, 2 Drawing Sheets

COMPOSITE FRESNEL LENS HAVING ARRAY OF LENS SEGMENTS PROVIDING LONG NARROW DETECTION RANGE

BACKGROUND OF THE INVENTION

1. Field of the Invention

The present invention generally relates to passive infrared detection systems and, more particularly, is concerned with a composite Fresnel lens having an array of Fresnel lens segments providing a long narrow detection range that adapts the lens for use in a detection system for covering a long narrow area of a building such as a hallway.

2. Description of the Prior Art

A passive infrared detection system detects heat energy radiated or emitted by an object, such as the body of a person, moving across the field of view of a heat sensor, such as a pyroelectric detector, of the detection system. The detection system must be capable of distinguishing between background temperature and the moving object having a different temperature from the background. Thus, the detection system has an electrical circuit operatively coupled to the heat sensor for producing a detection signal in response to the heat sensor detecting a change of temperature as, for example, caused by the body heat of a person entering the detection pattern. The sensitive area of the heat sensor is too small to detect a significant amount of heat energy radiated from a human body at a distance by using the heat sensor alone. Thus, detection systems typically employ a lens array made up of Fresnel lens segments for collecting and focusing a significantly greater amount of heat energy from specific distant areas on the heat sensor than would be received using the heat sensor alone.

A Fresnel lens segment is most efficient when it is flat, however, typically a lens array of Fresnel lens segments must be provided in a curved configuration in order to collect and focus the desired amount of heat energy on the heat sensor from a wide angle detection pattern. Thus, the lens array of Fresnel lens segments approximates this flatness by being provided as close-to-flat vertical segments arranged in contiguous side-by-side relationship along a curve having a constant radius. As known by those skilled in the art, such flat vertical segments are produced from a complete, whole Fresnel lens having a given diameter and a given focal length, and accordingly, the resultant lens segment will maintain the same characteristics as the whole lens from which it was taken. As used herein, the Fresnel lens from which the segment was taken will be referred to hereinafter as the original whole Fresnel lens.

The configuration of the Fresnel lens segments and their arrangement in a lens array will depend on the shape of the area from which energy is to be collected by the lens array. For example, a lens array to cover the area of a long narrow hallway in a building will need to utilize Fresnel lens segments with configurations and in an arrangement substantially different from those of a lens array to cover a relatively square or rectangular room in the building.

A factor complicating the design of Fresnel lens segment arrays for coverage of different shaped areas is the economic requirement that these arrays must be interchangeable so as to be able to fit and mount within a common housing allowing such interchangeability either at the factory or in the field. This requirement means that the size and the curved configuration of a lens array designed to cover a hallway be of the same size and have the same radius of curvature as a lens array designed to cover a room.

Consequently, a need exists for a design of a hallway lens array that will efficiently and effectively cover the long narrow area of a hallway while still being interchangeable with one covering a room so that the lens arrays can use a common housing.

SUMMARY OF THE INVENTION

The present invention provides a composite Fresnel lens designed to satisfy the aforementioned needs. The composite Fresnel lens of the present invention incorporates an array of Fresnel lens segments to which have been applied certain principles discovered by the applicant herein to provide the segments of the composite lens in the best configuration for efficiently collecting energy from an area having a long narrow shape. A first of these principles is that a segment having a width which is greater than one-third of the diameter of an original whole Fresnel lens from which the segment was taken can suffer significant signal cancellation effects whereas the converse is that a segment having a width which is less than one-third of the diameter of an original Fresnel lens from which the segment was taken will suffer significantly less or minimal signal cancellation effects. Thus, the converse of this principle can be applied for a given array curvature to determine an optimal and maximum segment width. A second of these principles is that a segment with its geometrical center located horizontally from the vertical centerline of the array along the curvature of the array through a circumferential distance greater than one-fourth of the radius of curvature of the array for long detection range segments and greater than one-half of the radius of curvature of the array for short detection range segments can result in significant shift in azimuth from what is expected with a flat lens array whereas the converse is that a segment with its geometrical center located horizontally from the vertical centerline of the array along the array curvature through a circumferential distance less than one-fourth of the radius of curvature of the array for long detection range segments and less than one-half of the radius of curvature of the array for short detection range segments will result in significantly less or minimal shift in azimuth.

Accordingly, the present invention is directed to a composite Fresnel lens for use in an infrared detection system. The composite Fresnel lens comprises: (a) an array of Fresnel lens segments having a given vertical centerline and a curvature of a given radius, the Fresnel lens segments being provided in first and second groups thereof; (b) each of the Fresnel lens segments in the first group thereof having a width which is less than one-third of the diameter of an original whole Fresnel lens from which the segment was taken, each of the lens segments of the first group also having a long detection range and having a geometrical center being located horizontally from the vertical centerline of the array along the curvature of the array through a circumferential distance less than one-fourth of the radius of curvature of the array; (c) each of the Fresnel lens segments in the second group thereof having a width which is less than one-third of the diameter of an original whole Fresnel lens from which the segment was taken, each of the lens segments of the second group also having a short detection range less than the long detection range by a predetermined amount and having a geometrical center being located horizontally from the vertical centerline of the array along the curvature of the array through a circumferential distance less than one-half of the radius of curvature of the array. On a scale of from one to one-hundred, the long detection range encompasses from twenty to one-hundred and the short detection range encompasses from zero to twenty.

The Fresnel lens segments have respective optical centers which are aligned along the vertical centerline of the array.

First and second Fresnel lens segments are aligned along the vertical centerline with the first Fresnel lens segment being the same in width as, being greater in length than, and disposed above, the second Fresnel lens segment. Third and fourth Fresnel lens segments are smaller in both length and width than the first Fresnel lens segment and disposed adjacent to opposite vertical sides of the first Fresnel lens segment and offset from the vertical centerline. Fifth and sixth Fresnel lens segments are the same in length as and smaller in width than the second Fresnel lens segment and are disposed adjacent to opposite vertical sides of the second Fresnel lens segment and offset from the vertical centerline. First and second Fresnel lens segments are in the first group while third, fourth, fifth and sixth Fresnel lens segments are in the second group.

The present invention is also directed to a passive detection system which comprises a housing, a heat sensor mounted in the housing, and the above-described composite Fresnel lens having a field of view with a narrow long range and being mounted across a front opening in the housing in front of the heat sensor. The composite Fresnel lens is operable for focusing heat energy on the heat sensor emanating from a source passing across the field of view and within the range of the lens. The system also comprises an electrical circuit connected to the heat sensor and being operable to produce a detection signal in response to a change in temperature in the energy collected by the lens and focused on and sensed by the heat sensor.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
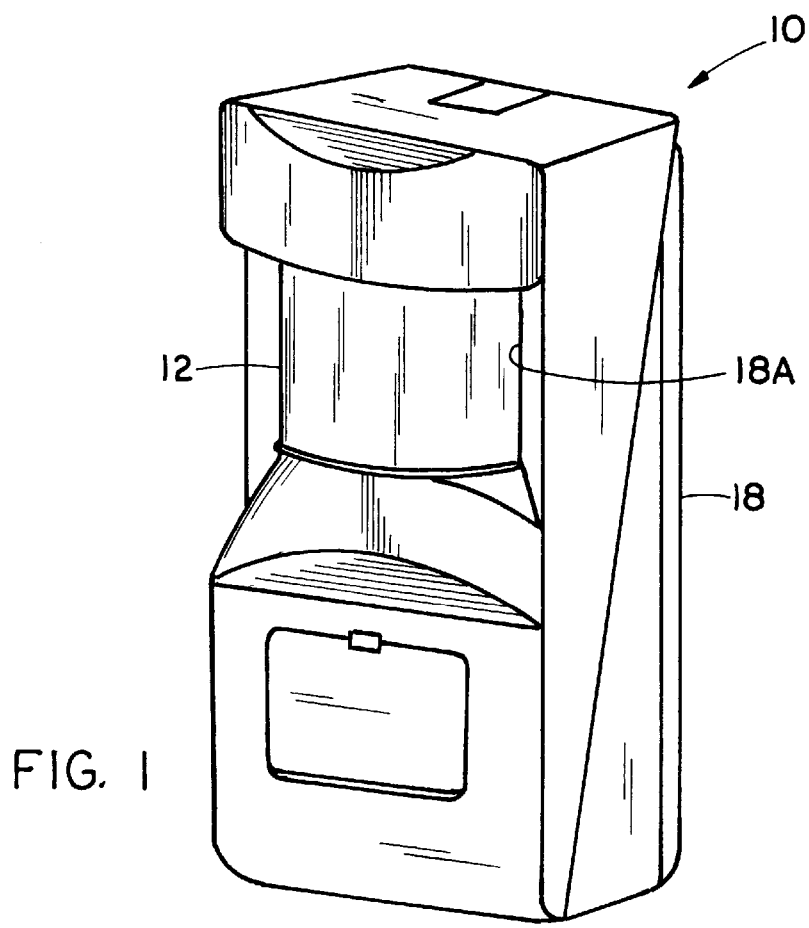
FIG. 1 is a front perspective view of a wall mounted unit of a passive infrared detection system which has a composite Fresnel lens of the present invention.
Figure 2:
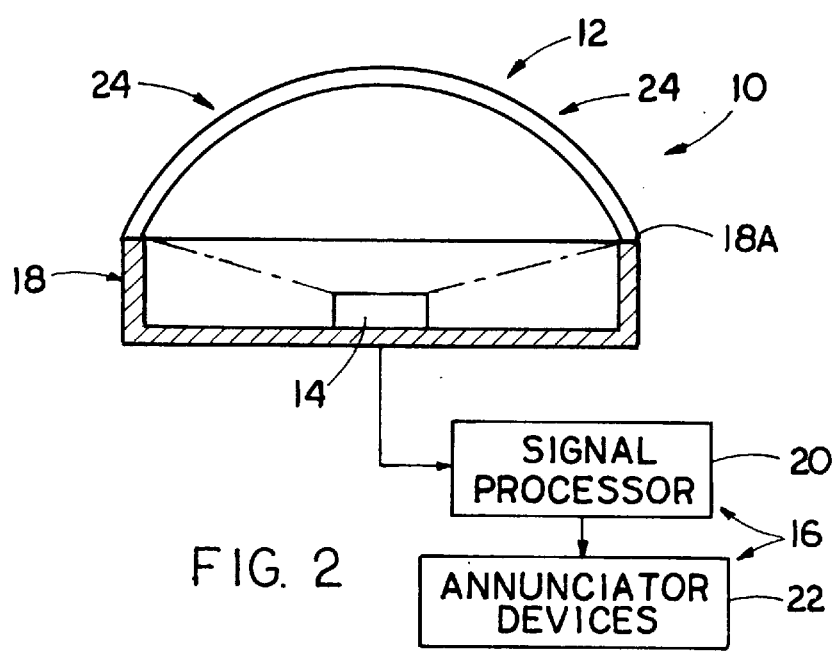
FIG. 2 is a diagrammatic representation of the detection system of FIG. 1 with the composite Fresnel lens of the present invention.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Referring now to the drawings, and particularly to FIG. 1, there is illustrated a passive infrared detection system 10 which incorporates a composite Fresnel lens 12 of the present invention that has a field of view and detection range for use of the system 10 in a long narrow area of a building, such as a hallway. The detection system 10 basically includes a heat sensor 14, the composite Fresnel lens 12, and an electrical circuit 16 disposed in a housing unit 18.

The heat sensor 14 of the system 10 may be a pyroelectric detector operable in a well-known manner to detect a change of temperature within the field-of-view of the system 10, for example, such as caused by the body heat of a person passing across the field of view. The composite Fresnel lens 12 of the system 10, having an arcuate or curved shape, is mounted across a front opening 18A in the housing unit 18 in front of the heat sensor 14. The composite Fresnel lens 12 is operable to collect heat energy emanating from within its field of view and range of coverage, such as radiated by a person, and to focus the collected heat energy on the heat sensor 14. The electrical circuit 16 typically includes a signal processor 20 connected to the heat sensor 14 and an annunciator device 22 (or a mechanical or solid state relay) connected to the signal processor 20. The signal processor 20 is operable to produce a detection signal when a change in temperature that meets a preset criteria is detected in the heat energy sensed by the heat sensor 14. The annunciator device 22 is operable to generate an audible or visual annunciation in response to the detection signal produced and applied thereto by the signal processor 20. The components implementing the heat sensor 14, signal processor 20 and annunciator device 22 of the detection system 10 are per se conventional and well-known to a person of ordinary skill in the art and need not be described nor illustrated in detail herein for such person to gain a thorough and complete understanding of the composite Fresnel lens 12 of the present invention.

Figure 4:
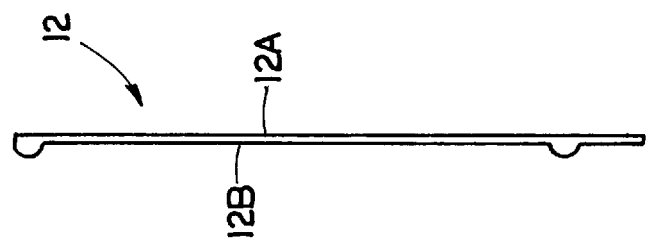
FIG. 4 is an end view of the composite Fresnel lens as seen along line 4—4 of FIG. 3.
Figure 3:
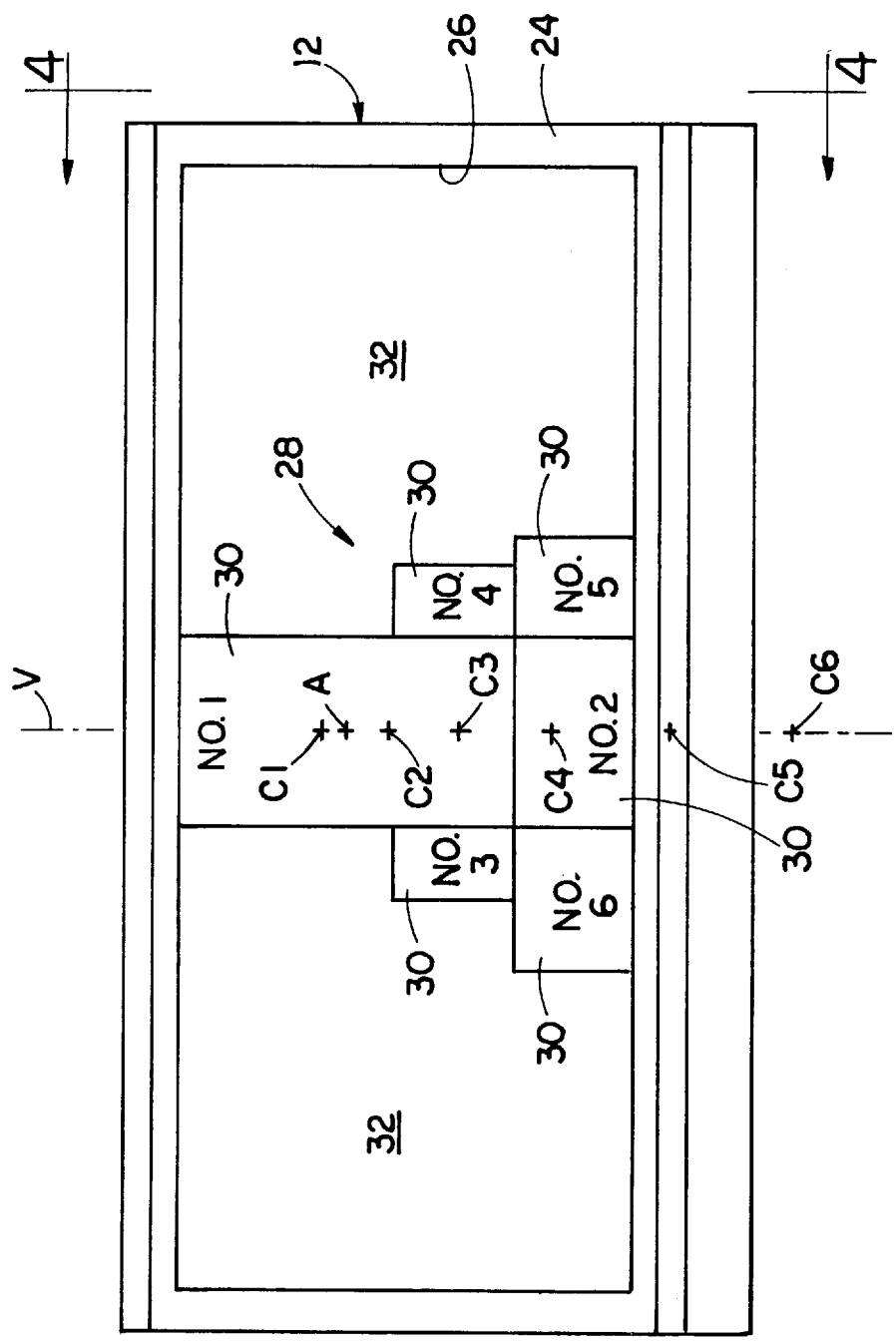
FIG. 3 is a diagrammatic layout view of the composite Fresnel lens of the present invention showing the array of Fresnel lens segments of the composite Fresnel lens.

Referring to FIGS. 3 and 4, the composite Fresnel lens 12 of the present invention employed in the passive detection system 10 has a front side 12A and a rear side 12B. The composite lens 12 includes a rectangular shaped perimeter frame 24 defining a rectangular window 26, an array 28 of active Fresnel lens segments 30 extending across a middle portion of the window 26, and a pair of optically disabled or inactive lens segments 32 disposed on opposite sides of the array 28 across the opposite end portions of the window 26. The active Fresnel lens segments 28 collect and focus energy on the heat sensor 14, whereas the inactive lens segments 32 do not collect and focus energy on the heat sensor 14 but instead scatter the energy so that it is not directed to the sensor. The front side 12A of the composite Fresnel lens 12 has a smooth surface, whereas the rear side 12B of the composite Fresnel lens 12 has fine grooves thereon at the locations of the Fresnel lens segments 30. The array 28 has a given vertical centerline V, a given focal distance, and a curvature of a given radius.

Certain principles discovered by the applicant herein through experimentation have been considered and the converse of these principles have been applied to different groups of the Fresnel lens segments 30 of the array 28 so as to provide the segments 30 in the best configurations for efficiently collecting energy from an area having a long narrow shape. These discovered principles are limited to typical radius of curvatures for a lens used in sensor-type products. A first of these principles is that a lens segment having a width which is greater than one-third of the diameter of the original whole Fresnel lens from which the segment was taken can suffer significant signal cancellation effects, whereas the converse is that a lens segment having a width which is less than one-third of the diameter of the original whole Fresnel lens from which the segment was taken will suffer significantly less or minimal signal cancellation effects. A second of these principles is that a lens segment having its geometrical center located horizontally from the vertical centerline of the array along the curvature of the array through a circumferential distance greater than one-fourth of the radius of curvature of the array for long range detection segments and greater than one-half of the radius of curvature for short range detection segments can result in significant shift in azimuth from what is expected with a flat lens array, whereas the converse is that a lens segment having its geometrical center located horizontally from the vertical centerline of the array along the array curvature through a circumferential distance less than one-fourth of the radius of curvature of the array for long range detection segments and less than one-half of the radius of curvature for short range detection segments will result in significantly less or minimal shift in azimuth. The relative meanings of long range and short range are defined herein on a scale of from zero to one-hundred with long range encompassing from twenty to one-hundred and short range encompassing from zero to twenty.

The converse of the first and second principles is applied to a first group of these lens segments 30 which are referred to herein as long range detection segments having the longer viewing range and are those lens segments 30 having their geometrical centers lying on or closely adjacent to the vertical centerline V of the array 28. Therefore, the lens segments 30 of the first group, the long range detection segments, have respective widths which are less than one-third of the diameter of the original whole Fresnel lens from which the respective segment was taken and are so located along the curvature of the array 28 such that the geometrical center of each respective segment is horizontally offset from the vertical centerline V of the array 28 a circumferential distance less than one-fourth of the radius of curvature of the array 28. Consequently, the long range detection lens segments 30 of the first group will suffer only minimal signal cancellation effects. Additionally, the converse of the first and second principles is applied to a second group of these lens segments 30 which are referred to herein as the short range detection segments having shorter viewing ranges and are those lens segments disposed adjacent the long range detection segments having their geometrical centers horizontally offset from the vertical centerline V of the array 28. Therefore, the lens segments 30 of the second group, the short detection range segments, have respective widths which are also less than one-third of the diameter of the original whole Fresnel lens from which the respective segment was taken and are so located along the curvature of the array 28 such that the geometrical center of each respective segment is horizontally offset from the vertical centerline V of the array 28 a circumferential distance less than one-half of the radius of curvature of the array 28. Since the short detection range lens segments 30 of the second group are horizontally offset from the centerline V of the array 28 and are located on the curvature of the array 28, there is an affected optical shift of each of these lens segments because the actual optical axis of each lens segment now differs from the geometrical optical axis of the original Fresnel lens from which the respective lens segment was taken. Consequently, due to this affected optical shift, the short range detection segments experience some shift in azimuth, however, this azimuth shift has a minimal effect on the detection pattern so long as the circumferential distance between the geometrical center of the lens segment and the vertical centerline V of the array 28 is less than one-half the radius of curvature of the array.

The first group of lens segments 30 of the array 28 to which the above-described first and second principles are applied is comprised of lens segments identified as No. 1 and No. 2 in FIG. 3, whereas the second group of lens segments 30 to which the above-described first and second principles are applied is comprised of lens segments identified as No. 3, No. 4, No. 5, and No. 6 in FIG. 3. More particularly, all of the active lens segment Nos. 1 through 6 of the array 28 have respective optical centers C1 through C6 aligned along the vertical centerline V of the array 28. Optical centers C2 through C6 are located outside of their respective lens segment Nos. 2 through 6. The axis A of the pyroelectric heat sensor 14 intersects the vertical centerline V through lens segment No. 1. Lens segment Nos. 1 and 2 are symmetrically aligned along the vertical centerline V of the array 28 and are the long range detection segments. Lens segment No. 1 is the same in width as, greater in length (or height) than, and disposed above, lens segment No. 2. Lens segment Nos. 3 and 4 are smaller in both length and width than lens segment No. 1 and are disposed adjacent to opposite vertical sides of lens segment No. 1. Further, lens segment Nos. 3 and 4 are offset from the vertical centerline V of the array 28. Lens segment Nos. 3 and 4 are substantially the same in length. Still further, lens segment Nos. 5 and 6 are substantially the same in length as and smaller in width than lens segment No. 2 and are disposed adjacent to opposite vertical sides of lens segment No. 2 and offset from the vertical centerline V of the array 28. Lens segments Nos. 3, 4, 5 and 6 are the short range detection segments. Lens segment No. 1 has the greatest size and range. The lens segments having the greater length (or height) compared to width and which have their geometrical centers located on or close to the vertical centerline V of the array 28 are more efficient and have longer viewing ranges. Thus, lens segment Nos. 1 and 2 have the greatest viewing ranges and lens segment Nos. 3–6 have shorter viewing ranges with lens segment No. 6 having the shortest range. In accordance with the principles of the present invention and in keeping within the design restraints of the front opening 18A of the housing unit 18 of the detection system 10, the size of the individual lens segments 30 of the array 28 which make up the composite lens 12 were so selected to present a balanced detection pattern for viewing down a long narrow hallway.

One practical example of the design of a lens array having its individual lens segments selected in accordance with the principles of the present invention is shown in the matrix chart data below. The lens segments and arrangement thereof in this example are the ones illustrated in FIG. 3 of the drawings and are identified as lens segments Nos. 1–6. This lens design is for use in a detection system that is to be mounted at a height of eight feet above the floor and having a heat detector with a detection range of eighty feet and for focusing on an object that is located two and one-half feet above the floor.

Example of Composite Fresnel Lens for Hallway

| Segment Number | Focal Length of Fresnel Lens | Lens Diameter | Field of View Range | Radius of Curvature (RC) | Segment Width | Segment Location from Vertical Centerline (SLFVCL) | Principle 1: Segment Width is less than ⅓ of Lens Diameter | Principle 2: Avg. SLFVCL <¼ RC- L.R. Seg. <½ RC- S.R. Seg. |
|---|---|---|---|---|---|---|---|---|
| 1 | 0.9" | 1.50" | 77' | 0.9" | 0.380" | 0.000" to +/− 0.190" Avg. = 0.000" | 0.380" < 0.500" | 0.000" < 0.225" |
| 2 | 0.9" | 1.50" | 27' | 0.9" | 0.380" | 0.000" to +/− 0.190" Avg. = 0.000" | 0.380" < 0.500" | 0.000" < 0.225" |
| 3 | 0.9" | 1.50" | 14' | 0.9" | 1.150" | 0.190" to 0.340" Avg. = 0.265" | 0.150" < 0.500" | 0.290" < 0.450" |
| 4 | 0.9" | 1.50" | 9' | 0.9" | 1.150" | 0.190" to 0.340" Avg. = 0.265" | 0.150" < 0.500" | 0.290" < 0.450" |
| 5 | 1.2" | 1.95" | 6' | 0.9" | 0.200" | 0.190" to 0.390" Avg. = 0.290" | 0.200" < 0.643" | 0.320" < 0.450" |
| 6 | 1.2" | 1.95" | 4' | 0.9" | 0.300" | 0.190" to 0.490" Avg. = 0.340" | 0.300" < 0.643" | 0.380" < 0.450" |

It should be noted from the above data that lens segments Nos. 1–4 were taken from an original whole Fresnel lens having a focal length of 0.9 inches and a lens diameter of 1.50 inches, whereas lens segments No. 5 and No. 6 were taken from an original whole Fresnel lens having a focal length of 1.2 inches and a lens diameter of 1.95 inches. The array of lens segments has a radius of curvature of 0.9 inches. As shown in FIG. 3, lens segments No. 1 and No. 2 have their geometrical centers located on the centerline V of the array 28, are the lens segments having the farthest field of view range, and are referred to as the long range detection segments that make up the first group of segments. The segment width of each of segments No. 1 and No. 2 is 0.380 inches and, in accordance with the first principle of the invention, is less than one-third of the diameter of the original whole Fresnel lens from which these segments were taken, i.e., 0.380 inch width is less than 0.500 inch (⅓ of 1.50). And, in accordance with the second principle of the invention, since each of these lens segments have their geometrical center lying on the vertical centerline, then their circumferential distance from the array centerline is zero which is less than one-fourth the radius of curvature of the array (¼×0.9=0.225). The second group of lens segments, segment Nos. 3–6, are the short range detection segments and, in like fashion, it can be seen from the above data that each of their widths are less than one-third of the diameter of the original whole Fresnel lens from which they were taken in thus complying with the first principle of the invention and, in compliance with the second principle of the invention, it can been seen from the data that the respective geometrical centers of lens segments Nos. 3–6 are horizontally offset along the radius of curvature of the array a circumferential distance less than one-half of the radius of curvature of the array.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

I claim:

1. A composite Fresnel lens for use in an infrared detection system, said composite Fresnel lens comprising:

(a) an array of Fresnel lens segments having a given vertical centerline and a curvature of a given radius, said Fresnel lens segments being provided in first and second groups thereof;

(b) each of said Fresnel lens segments in said first group thereof having a width which is less than one-third of the diameter of an original whole Fresnel lens from which said segment was taken, each of said lens segments of said first group also having a long detection range and having a geometrical center being located horizontally from said vertical centerline of said array along said curvature of said array through a circumferential distance less than one-fourth of the radius of curvature of said array;

(c) each of said Fresnel lens segments in said second group thereof having a width which is less than one-third of the diameter of an original whole Fresnel lens from which said segment was taken, each of said lens segments of said second group also having a short detection range less than said long detection range by a predetermined amount and having a geometrical center being located horizontally from said vertical centerline of said array along said curvature of said array through a circumferential distance less than one-half of the radius of curvature of said array.

2. The lens as recited in claim 1, where on a scale of from zero to one-hundred, said long detection range encompassing from twenty to one-hundred and said short detection range encompassing from zero to one-hundred.

3. The lens as recited in claim 1, wherein said Fresnel lens segments of said array thereof have respective optical centers which are aligned along said vertical centerline of said array.

4. The lens as recited in claim 1, wherein a first Fresnel lens segment and a second Fresnel lens segment of said array are aligned along said vertical centerline of said array with said first Fresnel lens segment being substantially the same in width as, being greater in length than, and disposed above, said second Fresnel lens segment.

5. The lens as recited in claim 4, wherein a third Fresnel lens segment and a fourth Fresnel lens segment of said array are smaller in both length and width than said first Fresnel lens segment and disposed adjacent to opposite vertical sides of said first Fresnel lens segment offset from said vertical centerline of said array.

6. The lens as recited in claim 4, wherein a third Fresnel lens segment and a fourth Fresnel lens segment of said array are substantially the same in length as and smaller in width than said second Fresnel lens segment.

7. The lens as recited in claim 6, wherein a fifth Fresnel lens segment and a sixth Fresnel lens segment of said array are substantially the same in length as and smaller in width than said second Fresnel lens segment and are disposed adjacent to opposite vertical sides of said second Fresnel lens segment offset from said vertical centerline of said array.

8. The lens as recited in claim 7, wherein said first and second Fresnel lens segments are in said first group thereof.

9. The lens as recited in claim 7, wherein said third, fourth, fifth and sixth Fresnel lens segments are in said second group thereof.

10. The lens as recited in claim 7, wherein said first Fresnel lens segment has the greatest size and range.

11. The lens as recited in claim 1, further comprising:
a pair of optically disabled lens segments located along opposite sides of said array of Fresnel lens segments.

12. A passive detection system, comprising:
(a) a housing;
(b) a heat sensor mounted in said housing;
(c) a composite Fresnel lens mounted across a front opening in said housing in front of said heat sensor, said composite Fresnel lens having a given field of view and range and being operable to focus heat energy on said heat sensor emanating from a source passing across said field of view and within said range of said composite Fresnel lens; and
(d) an electrical circuit connected to said heat sensor and being operable to produce a detection signal in response to a change in temperature in said field of view being sensed by said heat sensor;
(e) said composite Fresnel lens comprising
  (i) an array of Fresnel lens segments having a given vertical centerline and a curvature of a given radius, said Fresnel lens segments being provided in first and second groups thereof;
  (ii) each of said Fresnel lens segments in said first group thereof having a width which is less than one-third of the diameter of an original whole Fresnel lens from which said segment was taken, each of said lens segments of said first group also having a long detection range and having a geometrical center being located horizontally from said vertical centerline of said array along said curvature of said array through a circumferential distance less than one-fourth of the radius of curvature of said array;
  (iii) each of said Fresnel lens segments in said second group thereof having a width which is less than one-third of the diameter of an original whole Fresnel lens from which said segment was taken, each of said lens segments of said second group also having a short detection range less than said long detection range by a predetermined amount and having a geometrical center being located horizontally from said vertical centerline of said array along said curvature of said array through a circumferential distance less than one-half of the radius of curvature of said array.

13. The system as recited in claim 12, where on a scale of from zero to one-hundred, said long detection range encompassing from twenty to one-hundred and said short detection range encompassing from zero to one-hundred.

14. The system as recited in claim 12, wherein said Fresnel lens segments of said array thereof have respective optical centers which are aligned along said vertical centerline of said array.

15. The system as recited in claim 12, wherein a first Fresnel lens segment and a second Fresnel lens segment of said array are aligned along said vertical centerline of said array with said first Fresnel lens segment being substantially the same in width as, being greater in length than, and disposed above, said second Fresnel lens segment.

16. The system as recited in claim 15, wherein a third Fresnel lens segment and a fourth Fresnel lens segment of said array are smaller in both length and width than said first Fresnel lens segment and disposed adjacent to opposite vertical sides of said first Fresnel lens segment offset from said vertical centerline of said array.

17. The system as recited in claim 16, wherein a fifth Fresnel lens segment and a sixth Fresnel lens segment of said array are substantially the same in length as and smaller in width than said second Fresnel lens segment and disposed adjacent to opposite vertical sides of said second Fresnel lens segment offset from said vertical centerline of said array.

18. The system as recited in claim 15, wherein a third Fresnel lens segment and a fourth Fresnel lens segment of said array are substantially the same in length as and smaller in width than said second Fresnel lens segment.

19. The system as recited in claim 18, wherein a fifth Fresnel lens segment and a sixth Fresnel lens segment of said array are substantially the same in length as and smaller in width than said second Fresnel lens segment and are disposed adjacent to opposite vertical sides of said second Fresnel lens segment offset from said vertical centerline of said array.

20. The system as recited in claim 19, wherein said first and second Fresnel lens segments are in said first group thereof.

21. The system as recited in claim 20, wherein said third, fourth, fifth and sixth Fresnel lens segments are in said second group thereof.

22. The system as recited in claim 21, wherein said first Fresnel lens segment has the greatest size and range.

23. The system as recited in claim 22, wherein said sixth Fresnel lens segment has the shortest range and a width wider than the width of said fifth Fresnel lens segment.

24. The system as recited in claim 12, further comprising:
a pair of optically disabled lens segments located along opposite sides of said array of Fresnel lens segments.

* * * * *